(12) United States Patent
Longworth

(10) Patent No.: US 6,948,850 B2
(45) Date of Patent: Sep. 27, 2005

(54) BEARING ASSEMBLY

(75) Inventor: Norman Longworth, Bellevue Hill (AU)

(73) Assignee: Ausman Engineering & Associates, New South Wales (AU)

( * ) Notice: Subject to any disclaimer, the term of this patent is extended or adjusted under 35 U.S.C. 154(b) by 11 days.

(21) Appl. No.: 10/353,768

(22) Filed: Jan. 29, 2003

(65) Prior Publication Data

US 2003/0174910 A1 Sep. 18, 2003

(30) Foreign Application Priority Data

Feb. 1, 2002 (AU) .............................................. PS0280

(51) Int. Cl.$^7$ ........................... F16C 29/06; F16C 33/66
(52) U.S. Cl. ...................................... 384/45; 384/492
(58) Field of Search ............................. 384/13, 43–45, 384/492

(56) References Cited

U.S. PATENT DOCUMENTS

| | | | | |
|---|---|---|---|---|
| 2,724,624 A | * | 11/1955 | Barr ........................... | 384/492 |
| 3,425,759 A | * | 2/1969 | Schwarzschild ............ | 384/491 |
| 3,764,188 A | * | 10/1973 | Suska ......................... | 384/463 |
| 4,941,197 A | * | 7/1990 | Roeser ........................ | 384/44 |
| 5,076,713 A | * | 12/1991 | Morita ........................ | 384/45 |
| 5,615,955 A | | 4/1997 | Namimatsu | |
| 6,158,373 A | * | 12/2000 | Lange et al. ................ | 114/204 |
| 6,254,274 B1 | * | 7/2001 | Monahan et al. ............ | 384/44 |
| 6,352,366 B1 | | 3/2002 | Schneeberger et al. | |
| 6,419,397 B1 | | 7/2002 | Beaman | |

FOREIGN PATENT DOCUMENTS

| | | |
|---|---|---|
| DE | 31 48 933 A1 | 6/1983 |
| DE | 195 22 934 A1 | 1/1996 |
| DE | 196 12 571 A1 | 2/1997 |
| EP | 0 694 344 A1 | 7/1994 |
| EP | 1 022 477 A1 | 12/1999 |
| JP | 2002-81448 | * 3/2002 |

OTHER PUBLICATIONS

US 5,417,498, 5/1995, Hobbs (withdrawn)
Harken, Inc., "Press Release: CRX Roller Traveler", http://www.harken.com/press/00rtrav.php, at least as early as Apr. 29, 2002 (one page).
Frederiksen–DK, "New Captive Ball Batten Cars (BST—series 200)", http://www.frederiksen-dk.dk/english/Text/Batten/Series200bst/index.htm, at least as early as Apr. 29, 2002 (one page).
Frederiksen Ronstan, advertisement for the "Frederiksen Batten Car Systems", at least as early as Apr. 29, 2002 (one page).

* cited by examiner

Primary Examiner—Thomas R. Hannon
(74) Attorney, Agent, or Firm—The Webb Law Firm

(57) ABSTRACT

The invention provides a bearing assembly (3, 4) including a plurality of rolling bearing elements (5). At least one of the elements is a first type element, with the remainder of the elements being second type elements. The ratio of the number of the second type elements to the total number of bearing elements is greater than or equal to around 75%. The first type element is formed of a plastics material having different frictional properties than the second type elements. Retaining device, such as a closed loop, for retaining the elements (5) to define a bearing surface are also provided.

54 Claims, 3 Drawing Sheets

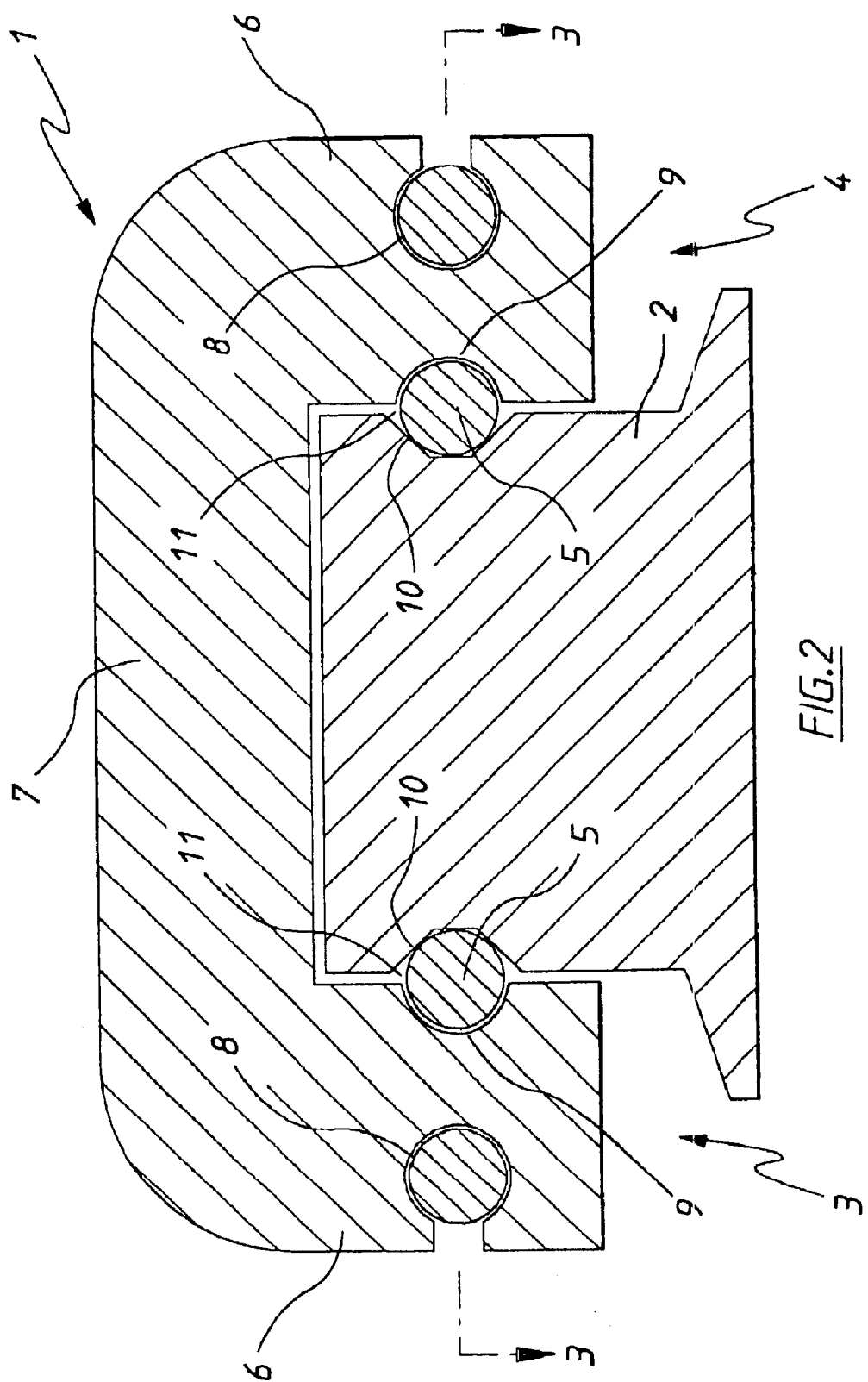

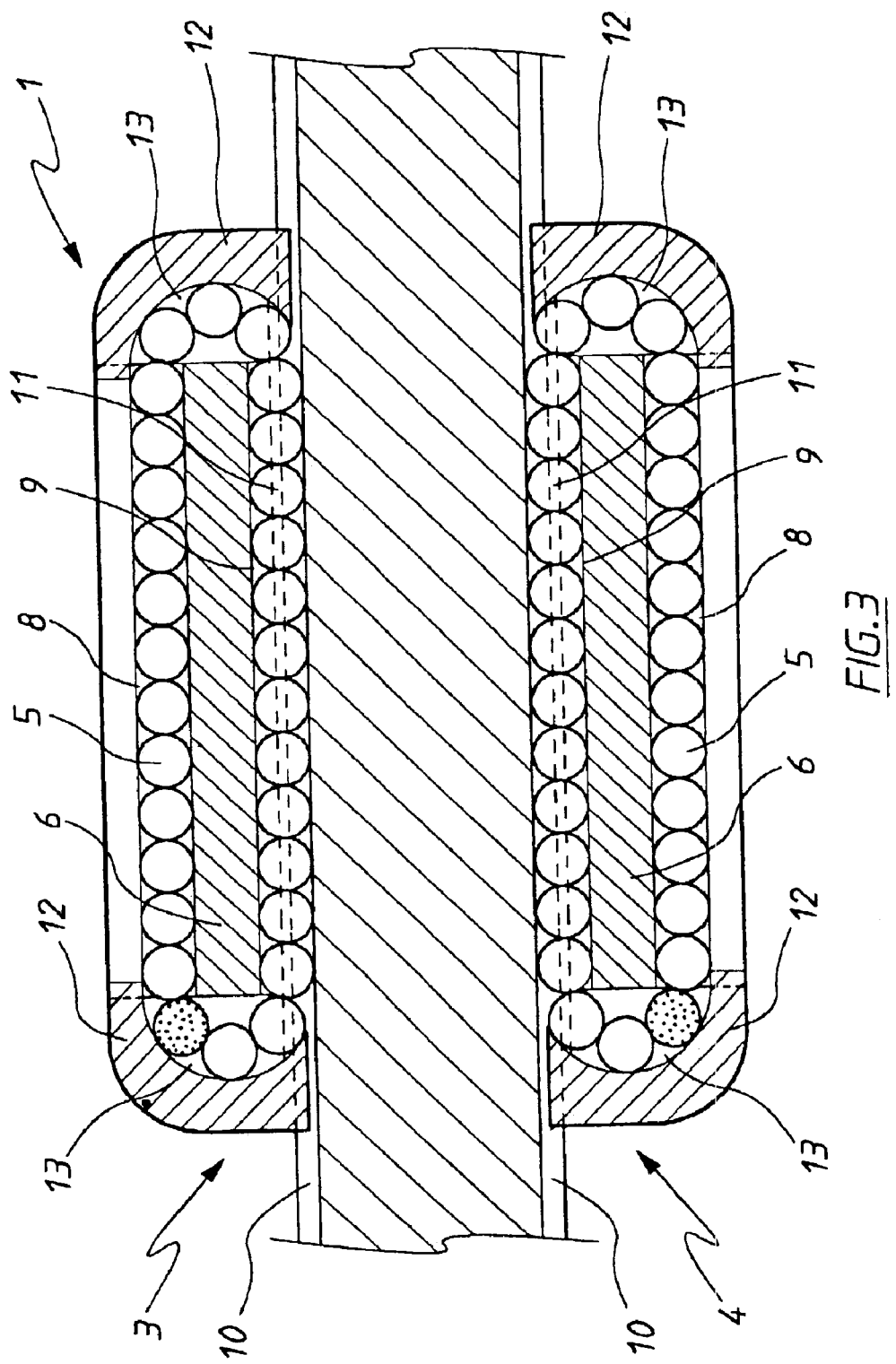

BEARING ASSEMBLY

BACKGROUND OF THE INVENTION

1. Field of the Invention

The present invention relates to a bearing assembly and in particular to a bearing assembly including rolling bearing elements such as balls or rollers.

The invention has been developed primarily for use in carriage assemblies, known as "travellers", disposed to traverse guide rails on sailing craft. It will therefore be described primarily with reference to this application. However, it will be appreciated that the invention is not limited to this particular field of use.

2. Description of the Prior Art

Any discussion of the prior art throughout the specification should in no way be considered as an admission that such prior art is widely known or forms part of common general knowledge in the field.

Travellers have been used in yacht fittings for many years. These devices typically incorporate uncaged ball or roller bearing assemblies to minimise friction as they run along a complementary guide rail on which they are slidably but captively retained. These bearing assemblies typically include either polyamide-imide or acetal bearing elements and run on anodised aluminum rails, relying on water for lubrication. Bearing elements formed of polyamide-imide or acetal have a high surface resistivity of around $10^{18}$ ohm, as measured using ASTM D257. Accordingly, when dry, they retain static charge and strongly attract dirt and dust particles.

The bearing assemblies are not sealed and accordingly the bearing elements are exposed to contamination by dirt, grit and salt, all of which adhere strongly to the surfaces of the elements, causing increased friction. It will be appreciated that under these conditions, the use of hydrocarbon lubricants exacerbates the problem of dirt and grit accumulation on surfaces of the rails and bearing elements, as the dirt and grit tends to adhere to the hydrocarbon lubricant.

Sometimes the rail anodising is treated with a polytetrafluoroethylene ("PTFE") coating. This coating can be applied using one of two methods, both of which have detrimental consequences. The first method involves high temperature fusing, which substantially reduces the yield strength of the aluminium in the rails, rendering it unsuitable for high stress applications. The second method involves applying a varnish-type suspension to the rail anodising. However, the varnish has a short service life of about twelve months, after which time the coating must be reapplied.

In use, the bearing elements rub against each other at double the translational speed of the traveller, causing wear and subsequently increased friction. As a result, the balls eventually skid, which in turn wears flats onto the bearing surfaces. This severely compromises both the efficiency and performance of the traveller. Another problem occurs when these bearing assemblies operate in dry conditions, for example on the mast. In these conditions, the rail tends to collect dust, which adheres to the bearing elements, rendering them dull and again increasing friction.

It is an object of the invention, in its presently contemplated form, to overcome or ameliorate one or more of the deficiencies of the prior art, or at least to provide a useful alternative.

SUMMARY OF THE INVENTION

According to a first aspect of the invention, there is provided a bearing assembly including:

a plurality of rolling bearing elements, including at least one first type element, the remainder of the elements being second type elements, wherein the first type element is formed of a plastics material having different frictional properties than the second type elements; and means for retaining said elements to define a bearing surface;

wherein the ratio of the number of the second type elements to the total number of bearing elements is greater than or equal to around 75%.

According to a second aspect of the invention, there is provided a bearing assembly including:

a plurality of rolling bearing elements, including at least one first type element, the remainder of the elements being second type elements, wherein the first type element is formed of a plastics material and is softer than the second type elements; and means for retaining said elements to define a bearing surface;

wherein the ratio of the number of the second type elements to the total number of bearing elements is greater than or equal to around 75%.

In a preferred embodiment, the first type element is formed of a plastics material having lower frictional properties than the second type elements and also being softer than the second type elements.

The term "softer" is to be construed as meaning soft relative to the second type elements, such that the softer element acts as a sacrificial seed element that gradually wears and deposits a thin film of residual material on the adjacent elements, the retaining means, or both.

Preferably, the ratio of the number of the second type elements to the total number of bearing elements is greater than around 80%. More preferably, the ratio of the number of the second type elements to the total number of bearing elements is greater than around 95%. In one particularly pertinent embodiment, one and only one first type element is used, the remainder being second type elements.

Preferably also, the lower friction material is also a soft material and more preferably this material is a high molecular weight plastics material. More preferably, the plastics material is a fluoropolymer. Even more preferably, the plastics material is a high molecular weight fluoropolymer, such as PTFE, Ultra High Molecular Weight Polyethylene (UHMWPE), fluorinated perfluroethylene-propylene (FEP) or perfluoro alkoxy alkane (PFA).

In a preferred form, the second type elements are formed of polyamide-imide or acetal.

Preferably, the bearing elements are spherical.

The preferred application of the bearing assembly is for use in carriage assemblies, or "travellers", on sailing craft. It will be appreciated, however, that the invention is not limited to this particular application. It may, for example, alternatively be configured as a thrust or roller bearing for use in a wide variety of different applications.

According to a third aspect, the invention provides a carriage assembly adapted for engagement with a complementary rail having a first rolling groove on each of its opposite outer surfaces, the carriage assembly including;

a body engageable with said rail;

a second rolling groove included on opposing sides of said body, said second rolling groove being alignable with said first rolling groove to form an inner rolling element race on opposing sides of said body;

an outer rolling element race spaced apart from each said inner race, said outer race being adapted to retain rolling bearing elements;

a bridging race extending between the ends of said outer and inner races to form a complete loop on opposing sides of said body;

a plurality of rolling bearing elements in each said loop, including at least one first type element, the remainder of the elements being second type elements, wherein the first type element is formed of a plastics material having different frictional properties than the second type elements; and wherein the ratio of the number of the second type elements to the total number of bearing elements is greater than or equal to around 75%.

According to a fourth aspect, the invention provides a carriage assembly for use on a sailing craft, said assembly adapted for engagement with a complementary rail having a first rolling groove on each of its opposite outer surfaces, the carriage assembly including;

a body engageable with said rail;

a second rolling groove included on opposing sides of said body, said second rolling groove being alignable with said first rolling groove to form an inner rolling element race on opposing sides of said body;

an outer rolling element race spaced apart from each said inner race, said outer race being adapted to retain rolling bearing elements;

a bridging race extending between the ends of said outer and inner races to form a complete loop on opposing sides of said body;

a plurality of rolling bearing elements in each said loop, including at least one first type element, the remainder of the elements being second type elements, wherein the first type element is formed of a plastics material and is softer than the second type elements; and wherein the ratio of the number of the second type elements to the total number of bearing elements is greater than or equal to around 75%.

BRIEF DESCRIPTION OF THE DRAWINGS

A preferred embodiment of the invention will now be described, by way of example only, with reference to the accompanying drawings in which:

FIG. 2 is a sectional view of the carriage assembly, taken along line 2—2 of FIG. 1; and FIG. 3 is a sectional view of the carriage assembly, taken along line 3—3 of FIG. 2.

PREFERRED EMBODIMENTS OF THE INVENTION

Figure 1:
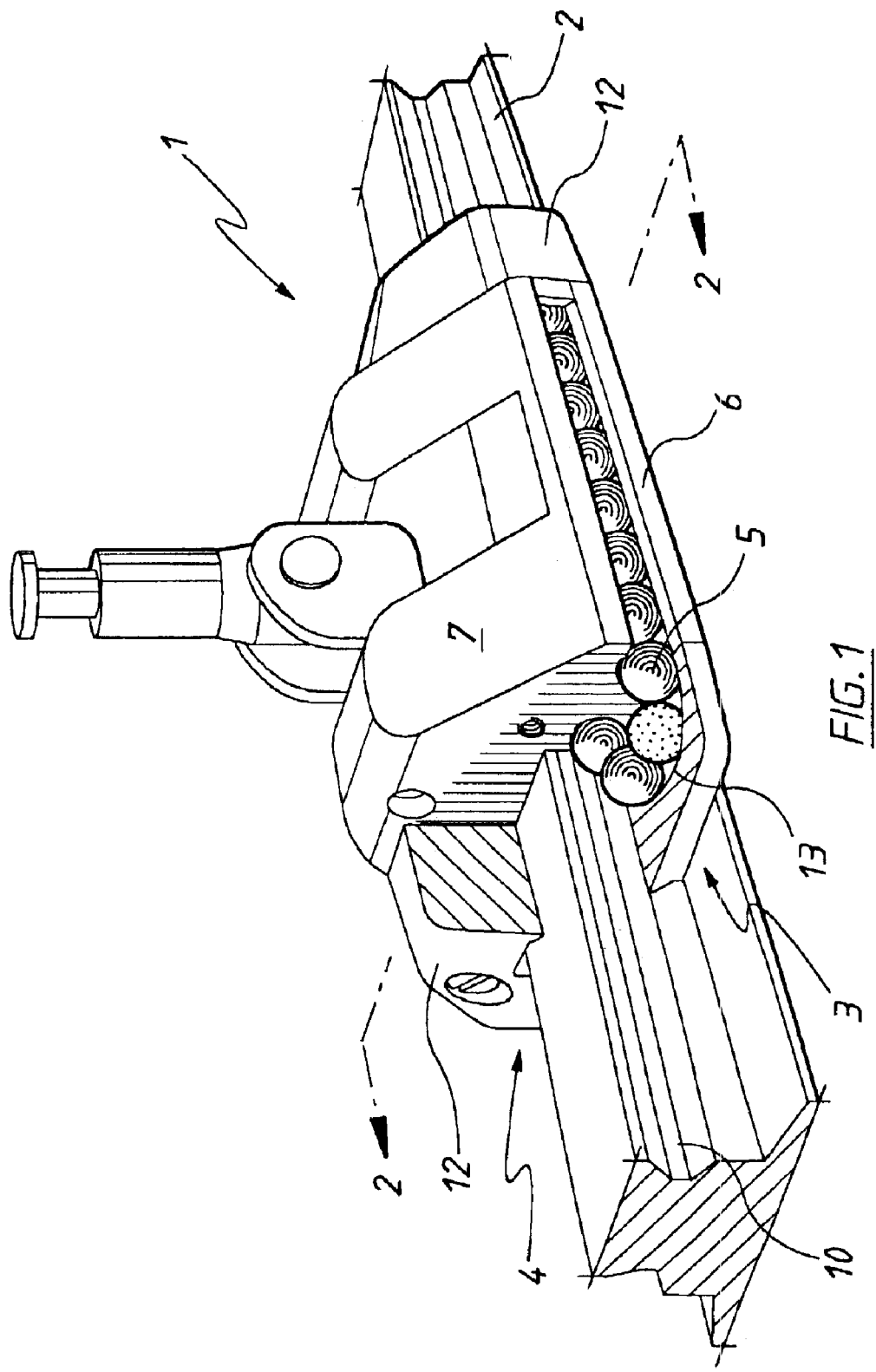
FIG. 1 is a cut-away perspective view of a carriage assembly including a pair of bearings according to the invention, shown mounted on a complementary rail.

Referring to the drawings, a carriage assembly in the form of a traveller 1 is adapted for engagement with a complementary rail 2. A pair of bearing assemblies 3 and 4 are positioned symmetrically on opposite sides of the rail for captively retaining the carriage in sliding engagement with the rail as illustrated in FIGS. 1 and 2.

Each bearing assembly includes thirty spherical bearing elements 5. Bearing 3 includes one PTFE bearing element and twenty-nine polyamide-imide bearing elements, while bearing 4 includes two PTFE bearing elements and twenty-eight polyamide-imide bearing elements.

The Traveller 1 is substantially C-shaped and includes a pair of flanges 6 interconnected by web 7. The flanges 6 are positioned on opposite sides of the rail 2 and the web 7 is positioned above the rail. The flanges 6 each include an outer circular ball race 8 and an inner angular groove 9. The rail 2 includes a pair of angular grooves 10, symmetrically disposed on opposite sides. Each groove is complimentary to and alignable with the respective opposing angular groove of the carriage to form a corresponding inner ball race 11. The carriage also includes a pair of end caps 12 on its opposite ends. Each cap includes a pair of internal arcuate conduits 13, each connecting the respective outer and inner ball race 8 and 11 to form a complete loop on each side of the rail.

The bearing elements 5 of bearing 3 and bearing 4 are retained within their respective closed loops. The bearing elements 5 in the inner ball races 11 captively retain the traveller 1 in sliding engagement with the rail 2. The bearing elements also hold the web 7 clear of the rail 2 and carry the applied load. In contrast, the bearing elements in the outer ball race 8 are relatively unloaded.

In use, the traveller 1 is slid along its rail 2 by rolling on the bearing elements 5 contained in the inner ball races 11. As the carriage moves, the bearing elements spin and move through their respective loops.

Larger or smaller versions of the carriage and rail assembly can be made. However, if the size of the bearing elements, loops and rails are kept constant, the number of bearing elements in each bearing assembly must be adjusted accordingly.

Experiments have shown, surprisingly, that the illustrated bearing assembly provides significantly improved frictional properties. It is believed that the PTFE and polyamide-imide balls work together synergistically to achieve this unexpected result. It is also believed that the improved frictional properties are enhanced by the PTFE elements wiping dirt from the rail and conditioning the surface of polyamide-imide elements and the rail with a thin coating of PTFE, which in turn reduces the electrostatic attraction of dirt and dust particles to both the polyamide-imide elements and the rail. However, it will be appreciated that the efficacy of the invention is not dependent upon any particular theoretical proposition.

It will be appreciated that the improved frictional properties also reduce the incidence of the bearing elements wearing flats, and therefore increases the reliability, consistency of operation, service life and overall performance of the traveller. Moreover, in all these aspects, the invention represents a practical and commercially significant improvement over the prior art. These improvements on the prior art are achieved without compromising the load carrying capacity of the traveller.

Although the invention has been described with reference to a specific example, it will be appreciated by those skilled in the art that the invention may be embodied in many other forms.

The claims defining the invention are as follows:

1. A bearing assembly including:

a plurality of rolling bearing elements, including at least one first type element and a plurality of second type elements, wherein the first type element is formed from a fluoropolymeric plastics material and the second type elements are formed from a different plastics material having load bearing capacity; and retaining means for retaining said bearing elements to define a bearing surface;

wherein the ratio of the number of the second type elements to the total number of bearing elements is greater than or equal to around 75%.

2. An assembly according to claim 1, wherein the ratio of the number of the second type elements to the total number of bearing elements is eater than or equal to around 80%.

3. An assembly according to claim 1, wherein the ratio of the number of the second type elements to the total number of bearing elements is greater than or equal to around 95%.

4. An assembly according to claim 1, including one and only one first type element.

5. An assembly according to claim 1, wherein said first type element is softer than the second type elements.

6. An assembly according to claim 1, wherein said first type element is formed from a fluoropolymeric plastics material having a relatively high molecular weight.

7. An assembly according to claim 1, wherein said fluoropolymeric plastics material is PTFE.

8. An assembly according to claim 1, wherein the second type elements are formed from polyamide-imide or acetal.

9. An assembly according to claim 1, wherein said elements are spherical.

10. An assembly according to claim 1, included in a carriage assembly, or "traveller", for use on a sailing craft.

11. A bearing assembly including:
a plurality of rolling bearing elements, including at least one first type element and a plurality of second type elements, wherein the first type element is formed from a fluoropolymeric plastics material and the second type elements are formed from a different plastics material having load bearing capacity, the first type elements being softer than the second type elements; and
retaining means for retaining said bearing elements to define a bearing surface;
wherein the ratio of the number of the second type elements to the total number of bearing elements is greater than or equal to around 75%.

12. An assembly according to claim 11, wherein the ratio of the number of the second type elements to the total number of bearing elements is greater than or equal to around 80%.

13. An assembly according to claim 11, wherein the ratio of the number of the second type elements to the total number of bearing elements is greater than or equal to around 95%.

14. An assembly according to claim 11, including one and only one first type element.

15. An assembly according to claim 11, wherein said first type element has different frictional properties than the second type elements.

16. An assembly according to claim 11, wherein said first type element is formed from a fluoropolymeric plastics material having relatively high molecular weight.

17. An assembly according to claim 11, wherein said fluropolymeric plastics material is PTFE.

18. An assembly according to claim 11, wherein the second type elements are formed from polyamide-imide or acetal.

19. An assembly according to claim 11, wherein said elements are spherical.

20. An assembly according to claim 11, included in a carriage assembly, or "traveller", for use on a sailing craft.

21. A carriage assembly adapted for engagement with a complementary rail having a first rolling groove on each of its opposite outer surfaces, the carriage assembly including:
a body captively slidably engageable with said rail;
a second rolling groove included on opposing sides of said body, said second rolling groove being alignable with said first rolling groove to form inner rolling element race on opposing sides of said body;
an outer rolling element race spaced apart from each said inner race, said outer race being adapted to retain rolling bearing elements;
a bridging race extending between the ends of said outer and inner races to form a complete loop on opposing sides of said body;
a plurality of rolling bearing elements in each said loop, including at least one first type element and a plurality of second type elements, wherein the first type element is formed from a fluoropolymeric plastics material and the second type elements are formed from a different plastics material having load bearing capacity; and
wherein the ratio of the number of the second type elements to the total number of bearing elements is greater than or equal to around 75%.

22. A carriage assembly according to claim 21, wherein the ratio of the number of the second type elements to the total number of bearing elements is greater than or equal to around 80%.

23. A carriage assembly according to claim 21, wherein the ratio of the number of the second type elements to the total number of bearing elements is greater than or equal to around 95%.

24. A carriage assembly according to claim 21, including one and only one first type element.

25. A carriage assembly according to claim 21, wherein said first type element is softer than the second type elements.

26. A carriage assembly according to claim 21, wherein said fluoropolymeric plastics material forming the first type element is a high molecular weight plastics material.

27. A carriage assembly according to claim 26, wherein said fluoropolymeric plastics material is PTFE.

28. A carriage assembly according to claim 21, wherein the different plastics material forming the second type elements is polyamide-imide or acetal.

29. A carriage assembly according to claim 21, wherein said elements are spherical.

30. A carriage assembly according to claim 21, wherein said body is defined by a pair of flanges interconnected by a web.

31. A carriage assembly according to claim 30, wherein said body is substantially C-shaped in transverse cross-section.

32. A carriage assembly according to claim 30, wherein said second rolling groove is formed on inner opposing faces of said flanges.

33. A carriage assembly according to claim 30, wherein said outer ball races are formed in outer portions of said flanges.

34. A carriage assembly according to claim 21, wherein said first and second rolling grooves are angular.

35. A carriage assembly according to claim 21, wherein, in use, rolling bearing elements located in said outer race are relatively unloaded.

36. A carriage assembly according to claim 21, including end caps spaced on opposite axial ends of said body.

37. A carriage assembly according to claim 36, wherein each of said end caps includes a bore defining said bridging race.

38. A carriage assembly for use on sailing craft, said assembly adapted for engagement with a complementary rail having a first rolling groove on each of its opposite outer surfaces, the carriage assembly including:
a body captively slidably engageable with said rail;
a second rolling groove included on opposing sides of said body, said second rolling groove being alignable with said first rolling groove to form inner rolling element race on opposing sides of said body;

an outer rolling element race spaced apart from each said inner race, said outer race being adapted to retain rolling bearing elements;

a bridging race extending between the ends of said outer and inner races to form a complete loop on opposing sides of said body;

a plurality of rolling bearing elements in each said loop, including at least one first type element and a plurality of second type elements, wherein the first type element is formed from a fluoropolymeric plastics material and the second type elements are formed from a different plastics material having a load bearing capacity; and wherein the ratio of the number of the second type elements to the total number of bearing elements is greater than or equal to around 75%.

39. A carriage assembly according to claim 38, wherein the ratio of the number of the second type elements to the total number of bearing elements is greater than or equal to around 80%.

40. A carriage assembly according to claim 38, wherein the ratio of the number of the second type elements to the total number of bearing elements is greater than or equal to around 95%.

41. A carriage assembly according to claim 38, including one and only one first type element.

42. A carriage assembly according to claim 38, wherein said first type element has different frictional properties than the second type elements.

43. A carriage assembly according to claim 38, wherein said fluoropolymeric plastics material forming the first type element is a high molecular weight plastics material.

44. A carriage assembly according to claim 43, wherein said fluoropolymeric plastics material is PTFE.

45. A carriage assembly according to claim 38, wherein the different plastics material forming the second type elements is polyamide-imide or acetal.

46. A carriage assembly according to claim 38, wherein said elements are spherical.

47. A carriage assembly according to claim 38, wherein said body is defined by a pair of flanges interconnected by a web.

48. A carriage assembly according to claim 47, wherein said body is substantially C-shaped in transverse cross-section.

49. A carriage assembly according to claim 47, wherein said second rolling groove is formed on inner opposing faces of said flanges.

50. A carriage assembly according to claim 47, wherein said outer ball races are formed in outer portions of said flanges.

51. A carriage assembly according to claim 38, wherein said first and second rolling grooves are angular.

52. A carriage assembly according to claim 38, wherein, in use, rolling bearing elements located in said outer race are relatively unloaded.

53. A carriage assembly according to claim 38, including end caps spaced on opposite axial ends of said body.

54. A carriage assembly according to claim 53, wherein each of said end caps includes a bore defining said bridging race.

* * * * *

UNITED STATES PATENT AND TRADEMARK OFFICE
CERTIFICATE OF CORRECTION

PATENT NO. : 6,948,850 B2
DATED : September 27, 2005
INVENTOR(S) : Longworth

It is certified that error appears in the above-identified patent and that said Letters Patent is hereby corrected as shown below:

<u>Column 5,</u>
Line 3, "is eater than" should read -- is greater than --.
Line 66, "form inner" should read -- form an inner --.

Signed and Sealed this

Second Day of May, 2006

JON W. DUDAS
*Director of the United States Patent and Trademark Office*